June 28, 1938.   J. A. CASTRICONE   2,122,085
GEAR CASE DRIVE SHAFT MOUNTING
Filed Feb. 18, 1937
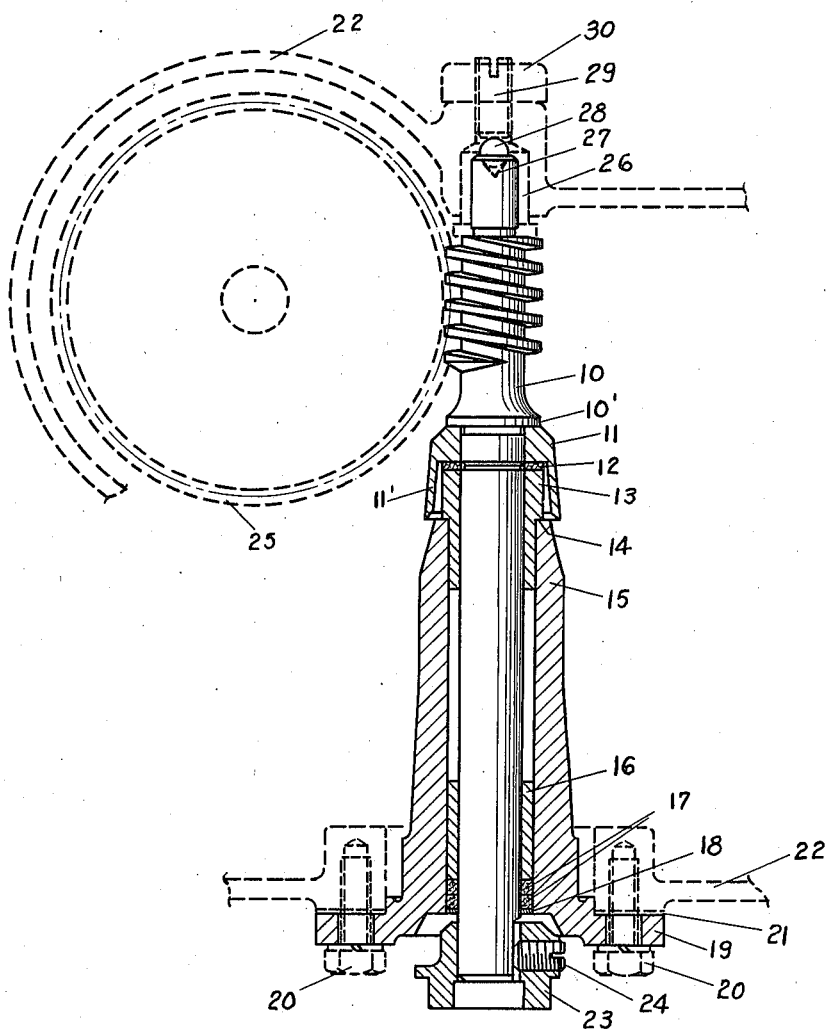
John A. Castricone
INVENTOR
BY Jeff & Jeff
ATTORNEYS.

Patented June 28, 1938

2,122,085

UNITED STATES PATENT OFFICE 2,122,085

GEAR CASE DRIVE SHAFT MOUNTING

John A. Castricone, Peoria, Ill.

Application February 18, 1937, Serial No. 126,443

8 Claims. (Cl. 308—36.4)

This invention relates to the mounting of a drive shaft in a gear case wherein oil is retained for lubrication.

In many such gear cases, such as used for domestic electrical appliances, the drive shaft is rotated at high speed by fractional horsepower motors and the requirements for successful structure include sure, adequate lubrication of the drive shaft, no oil leakage, and minimum frictional resistance to the rotation of the shaft. The problem is complicated by the necessity to provide in the structure some slight end play in the shaft for friction-free running and to permit the rotor of the direct connected motor to find its proper quiet running position in the magnetic field.

Then a further complication is introduced by the fact that during shipment and storage, before delivery to the customer, the device may be turned upside down or on its side and must be oil tight under these conditions.

The particular object of the invention is to provide a mounting for a drive shaft in an oil tight gear case that will permit adequate lubrication of the shaft without oil leakage.

Another object is to provide a mounting for a drive shaft that permits slight end play during operation without any tendency to pump oil out of the shaft bearings.

A still further object is to provide a drive shaft mounting that is free running and at the same time oil tight regardless of the position of the gear case.

Other objects and benefits will be disclosed by the following specification and drawing in which:

The figure shows a worm drive shaft; a mating worm gear and parts of a gear case in dotted outline; and the bearing bracket, bearings, washers, coupling, and thrower cap in section. Although I have chosen to shown my device as a side elevation, I do not desire it to be limited to any particular position.

Referring to the drawing, I designate the worm drive shaft by the numeral 10. The thrower cap 11, the function of which will later be described in detail, is press fitted against the shoulder 10' as shown. The bell skirt 11' covers the upper end of the bearing 13.

A fibre or other suitable washer 12 is interposed between the lower face of the thrower cap 11 and the upper face of the bearing 13. The bearing 13 is press fitted into the bracket 15 against the shoulder 14.

A lower bearing 16 is press fitted into the bracket 15 leaving a recess at the bottom end, into which absorbent washers 17 are inserted. These washers are retained in position by a metal washer 18.

The bearing bracket 15 is bolted to the gear case 22 by cap screws 20 through the flange 19 with a gasket 21 between the contact faces to make the connection oil tight.

A coupling member 23 is attached to the end of the worm drive shaft 10 by means of the set screw 24 as shown.

I show in dotted outline a mating worm gear 25 which may be of any desired size.

The upper end of the shaft 10 in the bearing 26 has a conical recess 27 which takes a thrust ball 28. The hardened adjustment screw 29 in the boss 30 bears against the ball 28 and provides means to adjust the end play in the worm shaft. The worm shaft, of course, is hardened and ground.

Having thus described the relations of the parts, I will now describe their functions and operation.

Assuming that face of the worm gear 25 is supplied with oil either by dipping or by other means and that the worm shaft 10 is driving the worm gear: it will be obvious that any end play in the worm shaft has relieved all pressure on the washer 12.

Under these conditions, oil is prevented from passing down the shaft 10 by the centrifugal action of the bell cap 11' which throws the oil away from the opening thus created.

The bearing 13 is made of a porous oil bearing bronze and will absorb through its exposed surface under the bell cap 11' enough oil in oil vapor or stray drops to provide sufficient lubrication to this bearing. Likewise, the bearing 16 is oil bearing bronze and its supply of lubricant is sufficiently maintained by capillary action from the bearing 13 along the shaft 10.

The absorbent washers 17 are provided only for the purpose of stopping oil leaks when the gear case is placed in a position which would otherwise permit oil to escape. They are not designed to stop oil under normal conditions because by my structure such function is unnecessary.

It will further be appreciated that when the worm shaft is mounted in the position as shown, the weight of the shaft on the washer 12 will also provide an effective seal.

In all the foregoing, it will be noted that there is nothing about my structure to cause undue friction and the drive shaft is, therefore, mounted to make it quite free running.

Having thus described my invention, I now claim as new:

1. In a mounting for a drive shaft in a gear case; the combination of a drive shaft, a bracket member supporting said shaft on the exterior of the gear case, a porous bearing bushing carried by said supporting means and surrounding a portion of said shaft internal of said casing, one end of said bushing being exposed to the interior of the gear case, an oil thrower cap attached to the drive shaft, said cap having a flange extending over and in spaced relation to the exposed end of said bushing whereby oil is thrown away from the shaft by centrifugal force, a sealing washer interposed between said exposed end of said bushing and the thrower cap, and means sealing the connection between said bracket and gear case.

2. In a mounting for a drive shaft in a gear case; the combination of a substantially vertical drive shaft having a portion extending within the gear case, a driving member on said portion, a separable bracket secured to said gear case and supporting said shaft, another portion of said shaft extending out of said gear case through said bracket, a porous oil bearing bushing carried by said bracket internally of said gear case, one end of said bushing being exposed to the interior of said gear case, an oil thrower cap attached to said drive shaft, said cap having a flange extending outwardly over the exposed end of said bushing and inclined outwardly and downwardly along said shaft and in spaced relation to said shaft and bushing whereby oil may be thrown away from said shaft and bushing by centrifugal force, and means for sealing the joint between said other portion of said shaft and said bracket against oil leakage.

3. In a mounting for a worm drive shaft; the combination of a gear case housing a portion of said shaft and a separable bracket supporting said shaft from the outside of said gear case, porous oil bearing bushings in said bracket, one end of one of said bushings protruding from the bracket into the interior of the gear case, and a bell shaped thrower cap secured to said shaft with the bell end extending over and in spaced relation to the exposed end of the bushing and covering the interior face contact between the thrower cap and said exposed end of said bushing, whereby oil absorption into the exposed surface of the bearing is permitted but is prevented from escaping between the contact faces of the thrower cap and bushing by the centrifugal action imparted to the oil by the thrower cap.

4. In a mounting for a worm drive shaft; the combination of a gear case housing a portion of said shaft and a separable bracket supporting said shaft and attached to said gear case, a bushing in said bracket and within said gear case and surrounding said drive shaft, said drive shaft normally being substantially vertically disposed, one end of said bushing being extended beyond said bracket within said gear case, and a bell shaped oil thrower cap attached to said shaft adjacent to said bushing and extending outwardly and downwardly over and in spaced relation to the exposed end of said bushing, whereby to throw oil away from said shaft and bushing.

5. In a mounting for an integral worm drive shaft; the combination of a casing, a drive shaft extending from the interior of said casing, a bracket supporting said shaft, a self-lubricating bushing carried by said bracket within said casing, one end of said bushing projecting from the bracket into exposure within the interior of the casing, and a bell shaped thrower cap attached to the shaft with the bell end thereof extending over the exposed end of the bushing, said thrower cap having bearing relationship with a portion of the exposed bushing end and having its bell end surrounding and covering a substantial portion of the exposed end of said bushing.

6. In a mounting for a drive shaft in a gear case; a substantially vertical drive shaft extending through said casing from the exterior to the interior thereof, means providing a bearing for said shaft within said gear case, one portion of said shaft being extended beyond said bearing means within said gear case, and oil collar means secured to said shaft adjacent to said portion, said oil collar means having a skirt extending circumferentially of said shaft and bearing and inclined outwardly and downwardly from said shaft portion over and in spaced relation to said bearing means, the space between said skirt and bearing means being unobstructed.

7. In a mounting for a worm drive shaft, the combination of a casing, a drive shaft extending from the interior of said casing, a bracket supporting said shaft, a self-lubricating bushing carried by said bracket within said casing, one end of said bushing projecting from the bracket into exposure within the interior of the casing and a bell-shaped thrower cap attached to the shaft with the bell end thereof extending over the end of the bushing, said thrower cap having bearing relationship with the bushing end and having its bell end surrounding and covering a substantial portion of the end of said bushing.

8. In a mounting for a drive shaft in a gear case, a drive shaft extending upwardly through said casing from the exterior to the interior thereof, means providing a bearing for said shaft within said gear case, one portion of said shaft being extended beyond said bearing means within said gear case, and oil collar means secured to said shaft adjacent to said portion, said oil collar means having a skirt extending circumferentially of said shaft and bearing and inclined outwardly from said shaft portion over and in spaced relation to said bearing means, the space between said skirt and bearing means being unobstructed.

JOHN A. CASTRICONE.